(12) United States Patent
Baek et al.

(10) Patent No.: US 9,260,572 B2
(45) Date of Patent: Feb. 16, 2016

(54) CNT-POLYMER COMPLEX CAPABLE OF SELF-DOPING BY EXTERNAL STIMULI AND PROCESS FOR PREPARING THE SAME

(71) Applicant: KOREA INSTITUTE OF SCIENCE AND TECHNOLOGY, Seoul (KR)

(72) Inventors: Kyung Youl Baek, Seoul (KR); Seung Sang Hwang, Seoul (KR); Chong Min Koo, Goyang-si (KR); Soon Man Hong, Seoul (KR); Hyeon Yeol Jeon, Busan (KR); Kie Yong Cho, Seoul (KR); Seon-ja Song, Seoul (KR); Hyun Ji Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/681,368

(22) Filed: Apr. 8, 2015

(65) Prior Publication Data
US 2016/0017103 A1    Jan. 21, 2016

(30) Foreign Application Priority Data

Jul. 21, 2014   (KR) ........................ 10-2014-0091869

(51) Int. Cl.
| | |
|---|---|
| H01L 51/00 | (2006.01) |
| C08G 61/12 | (2006.01) |
| C08G 75/06 | (2006.01) |
| C08K 3/04 | (2006.01) |
| C08L 53/00 | (2006.01) |

(Continued)

(52) U.S. Cl.
CPC .................................. C08G 81/027 (2013.01)

(58) Field of Classification Search
CPC .. H01L 51/0049; C08G 61/126; C08G 75/06; C08G 2261/18; C08G 2261/20; C08G 2261/126; C08K 3/04; B82Y 40/00

USPC ........................................................... 525/186
See application file for complete search history.

(56) References Cited

U.S. PATENT DOCUMENTS

| | | | |
|---|---|---|---|
| 2010/0078598 A1 | 4/2010 | Lee et al. | |
| 2011/0180140 A1* | 7/2011 | Zhai ....................... | B82Y 10/00 |
| | | | 136/256 |

(Continued)

FOREIGN PATENT DOCUMENTS

| | | |
|---|---|---|
| KR | 1020080070528 A | 7/2008 |
| KR | 10-2010-0095847 A | 9/2010 |

(Continued)

OTHER PUBLICATIONS

Dabera et al., Hybrid Cardon Nanotube Networks as Efficient Hole Extraction Layers for Organic Photovoltaics, ACS None, Dec. 12, 2012, pp. 556-565 ,vol, 7 No. 1 , USA.

*Primary Examiner* — Fred M Teskin
(74) *Attorney, Agent, or Firm* — Goldilocks Zone IP Law

(57) ABSTRACT

Provided are a CNT-polymer complex and a process for preparing the same. The CNT-polymer complex includes carbon nanotubes (CNT) coated with a block copolymer of a conjugated polymer and a non-conjugated polymer, wherein the non-conjugated polymer comprises at least one monomer selected from the group consisting of styrene, butadiene, isoprene, methacryl, acryl, acryl amide, methacryl amide, acrylonitrile, vinyl acetate, vinyl pyridine and vinyl pyrrolidone in which at least one selected from the group consisting of a sulfone group, carboxyl group, acryl group and phosphate group is protected with a protective group, and provides at least one dopant selected from the group consisting of a sulfone group, carboxyl group, acryl group and phosphate group by external stimuli so that self-doping is allowed; and the complex is soluble to an organic solvent in a neutral state but is insoluble to any solvent after subjecting it to external stimuli.

10 Claims, 8 Drawing Sheets

(51) Int. Cl.
  *C08G 81/02* (2006.01)
  *B82Y 40/00* (2011.01)

(56) References Cited

U.S. PATENT DOCUMENTS

2015/0060737 A1 3/2015 Navarro et al.
2015/0203639 A1 7/2015 Back et al.

FOREIGN PATENT DOCUMENTS

| KR | 101154869 B1 | 6/2012 |
| KR | 101196370 B1 | 10/2012 |
| KR | 10-2013-0117237 A | 10/2013 |
| KR | 101365138 B1 | 2/2014 |
| KR | 1020140027719 A | 3/2014 |
| WO | 2013-150242 A1 | 10/2013 |

* cited by examiner

CNT-POLYMER COMPLEX CAPABLE OF SELF-DOPING BY EXTERNAL STIMULI AND PROCESS FOR PREPARING THE SAME

CROSS-REFERENCE TO RELATED APPLICATION

This application claims priority to Korean Patent Application No. 10-2014-0091869, filed on Jul. 21, 2014, and all the benefits accruing therefrom under 35 U.S.C. §119, the contents of which in its entirety are herein incorporated by reference.

BACKGROUND

1. Field

The present disclosure relates to a CNT-polymer complex capable of self-doping by external stimuli and a process for preparing the same. More particularly, the present disclosure relates to a CNT-polymer complex that includes carbon nanotubes (CNT) coated with a block copolymer of a conjugated polymer and a non-conjugated polymer, is neutral and soluble in organic solvents, and is capable of self-doping by external stimuli, as well as to a process for preparing the same.

2. Description of the Related Art

In order for carbon nanotubes (CNT) to exert excellent physical properties in composite materials, a carbon nanotube dispersion technique is required. In order to use effective properties and benefits of a CNT nanoscale, CNT must be well dispersed.

Methods for accomplishing uniform dispersion of CNTs by increasing the compatibility between CNTs and a solvent or polymer may be classified into mechanical dispersion methods and chemical dispersion methods. Mechanical dispersion methods are based on external force such as ultrasonic waves and may provide an unsatisfactory dispersion degree. Chemical dispersion methods are classified into covalent bonding dispersion methods and non-covalent bonding dispersion methods. Covalent bonding dispersion methods include linking a covalent bond directly to the surface of CNTs and generate surface defects, and thus they may cause degradation of electrical properties. Therefore, covalent bonding dispersion methods are problematic in that they are not suitable for applications using electrical properties. On the contrary, non-covalent bonding methods use a material capable of interaction with the surface of CNTs and generate no defects in the structure of CNTs. Therefore, non-covalent bonding methods are advantageous in that they allow CNTs to exert their unique physical properties. As an example of such non-covalent bonding dispersion methods, a conjugated polymer surrounds the surface of CNTs with ease, thereby increasing the solubility of CNTs.

Meanwhile, conjugated polymers undergo a rapid increase in electrical conductivity by doping. In general, such doping methods include p-doping using an electron acceptor (e.g. $I_2$, $AsF_5$) causing partial oxidation and n-doping using an electron donor (e.g. Na, K) causing partial reduction. Introduction of a dopant generates a partial charge defect and reduces a band gap. As a result, it is possible to accomplish improvement of electrical properties, including an increase in conductivity or hole mobility. A PEDOT/PSS complex including a poly(3,4-ethylenedioxythiophene (PEDOT) as a conductive polymer and a polystyrene sulfonate (PSS) as a dopant is commercially available as aqueous solution due to PSS which is an ionic polymer. The complex is disadvantageous in that it undergoes degradation of long-term shelf stability in the state of aqueous solution due to ionic groups. In addition, the complex exists as an acid or base, and thus may cause damages to a substrate during a solution process, which may affect electronic devices significantly.

When dispersing carbon nanotubes by using such a conjugated polymer doped with an acid or base, dispersion is possible based on non-covalent bonding. However, in this case, pH and water dispersion may be problematic and cause damages to a substrate in applying to organic electronics, which affects electronic devices significantly.

REFERENCES

Patent Documents

Korean Patent Laid-Open No. 10-2014-0027719

SUMMARY

The present disclosure is directed to providing a CNT-polymer complex that includes a block copolymer of a conjugated polymer bound firmly to the surface of carbon nanotubes (CNT) via pi-stacking and a non-conjugated polymer providing at least one dopant selected from the group consisting of a sulfone group, carboxyl group, acryl group and phosphate group by external stimuli, has excellent dispersibility in an organic solvent in a neutral state, is self-doped by external stimuli after coating to provide increased conductivity, and is insoluble to any solvent after external stimuli.

In one aspect, there is provided a CNT-polymer complex that includes carbon nanotubes (CNT) coated with a block copolymer of a conjugated polymer and a non-conjugated polymer, wherein the non-conjugated polymer includes at least one monomer selected from the group consisting of styrene, butadiene, isoprene, methacryl, acryl, acryl amide, methacryl amide, acrylonitrile, vinyl acetate, vinyl pyridine and vinyl pyrrolidone in which at least one selected from the group consisting of a sulfone group, carboxyl group, acryl group and phosphate group is protected with a protective group, and provides at least one dopant selected from the group consisting of a sulfone group, carboxyl group, acryl group and phosphate group by external stimuli so that self-doping is allowed; and the complex is soluble to an organic solvent in a neutral state but is insoluble to any solvent after subjecting it to external stimuli.

According to an embodiment, the protective group may be neopentyl or tert-butyl.

According to another embodiment, the external stimuli may include treatment with at least one selected from the group consisting of heat, light and acidic chemicals.

According to still another embodiment, the non-conjugated polymer may include at least one monomer selected from the group consisting of neopentylsulfonated styrene, tert-butyl vinylbenzoate and tert-butyl acrylate.

According to still another embodiment, the conjugated polymer may be selected from the group consisting of polyacetylene, polyaniline, polypyrrole, polythiophene and polysulfur nitride.

According to still another embodiment, the conjugated polymer may have a molecular weight of 1,000-30,000.

According to still another embodiment, the block copolymer of a conjugated polymer and non-conjugated polymer may be a P3HT-b-PNSS block copolymer represented by the following Chemical Formula 1:

[Chemical Formula 1]

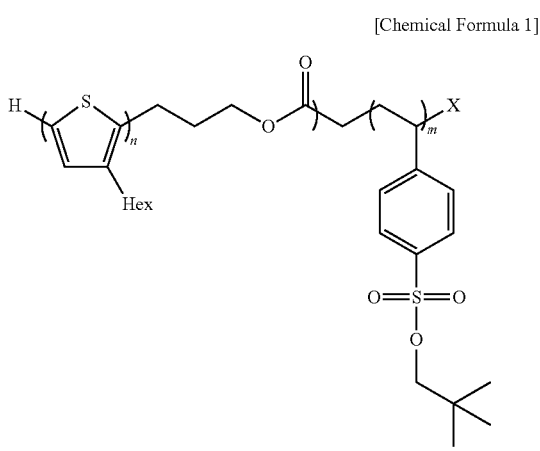

wherein Hex represents hexane, X represents a halogen atom selected from the group consisting of Cl, Br and I, n is an integer of 5-200, and m is an integer of 1-1000.

According to still another embodiment, the heat treatment may be carried out at 150-250° C.

According to still another embodiment, the carbon nanotube may be at least one selected from the group consisting of single-walled carbon nanotube (SWCNT), double-walled carbon nanotube (DWCNT), multi-walled carbon nanotube (MWCNT) and rope-walled carbon nanotube (RWCNT).

According to yet another embodiment, the conjugated polymer block in the block copolymer may be linked to CNT via π-π bonding, and the non-conjugated block may be positioned toward the exterior of CNT.

In another aspect, there is provided a process for preparing a CNT-polymer complex, including:

preparing a block copolymer of a conjugated polymer and a non-conjugated polymer;

blending carbon nanotubes (CNT) with the block copolymer to provide CNT coated with the block copolymer; and subjecting the neutral complex obtained from the operation of providing CNT coated with the block copolymer to post-treatment using at least one external stimulus selected from the group consisting of heat, light and acidic chemicals to carry out self-doping, wherein the non-conjugated polymer includes at least one monomer selected from the group consisting of styrene, butadiene, isoprene, methacryl, acryl, acryl amide, methacryl amide, acrylonitrile, vinyl acetate, vinyl pyridine and vinyl pyrrolidone in which at least one selected from the group consisting of a sulfone group, carboxyl group, acryl group and phosphate group is protected with a protective group, and provides at least one dopant selected from the group consisting of a sulfone group, carboxyl group, acryl group and phosphate group by external stimuli so that self-doping is allowed.

According to an embodiment, further comprises carrying out secondary doping by exposing the complex to vapor of organic solvent or adding the organic solvent to the complex.

According to another embodiment, the organic solvent is at least one selected from the group consisting of THF, DMSO, DMF, ethyl alcohol and ethylene glycol.

The CNT-polymer complex disclosed herein includes a block copolymer of a conjugated polymer bound firmly to the surface of carbon nanotubes (CNT) via pi-stacking and a non-conjugated polymer providing at least one dopant selected from the group consisting of a sulfone group, carboxyl group, acryl group and phosphate group by external stimuli, and has excellent solubility to an organic solvent in a neutral state. Thus, after carrying out coating through a solution process, it is possible to obtain a complex capable of self-doping by forming an acidic material in situ by external stimuli and to provide a conductive complex having excellent physical properties. In addition, it is possible to carry out a solution process by using an organic solvent instead of the conventional aqueous phase process. The film obtained as disclosed herein forms a dopant in situ by external stimuli to perform doping to P3HT and CNT, thereby improving electrical conductivity. Further, the film obtained by external stimuli is not soluble to both aqueous solvents and organic solvents, thereby increasing the solvent selectivity in the subsequent solution process.

DETAILED DESCRIPTION

Figure 1A:
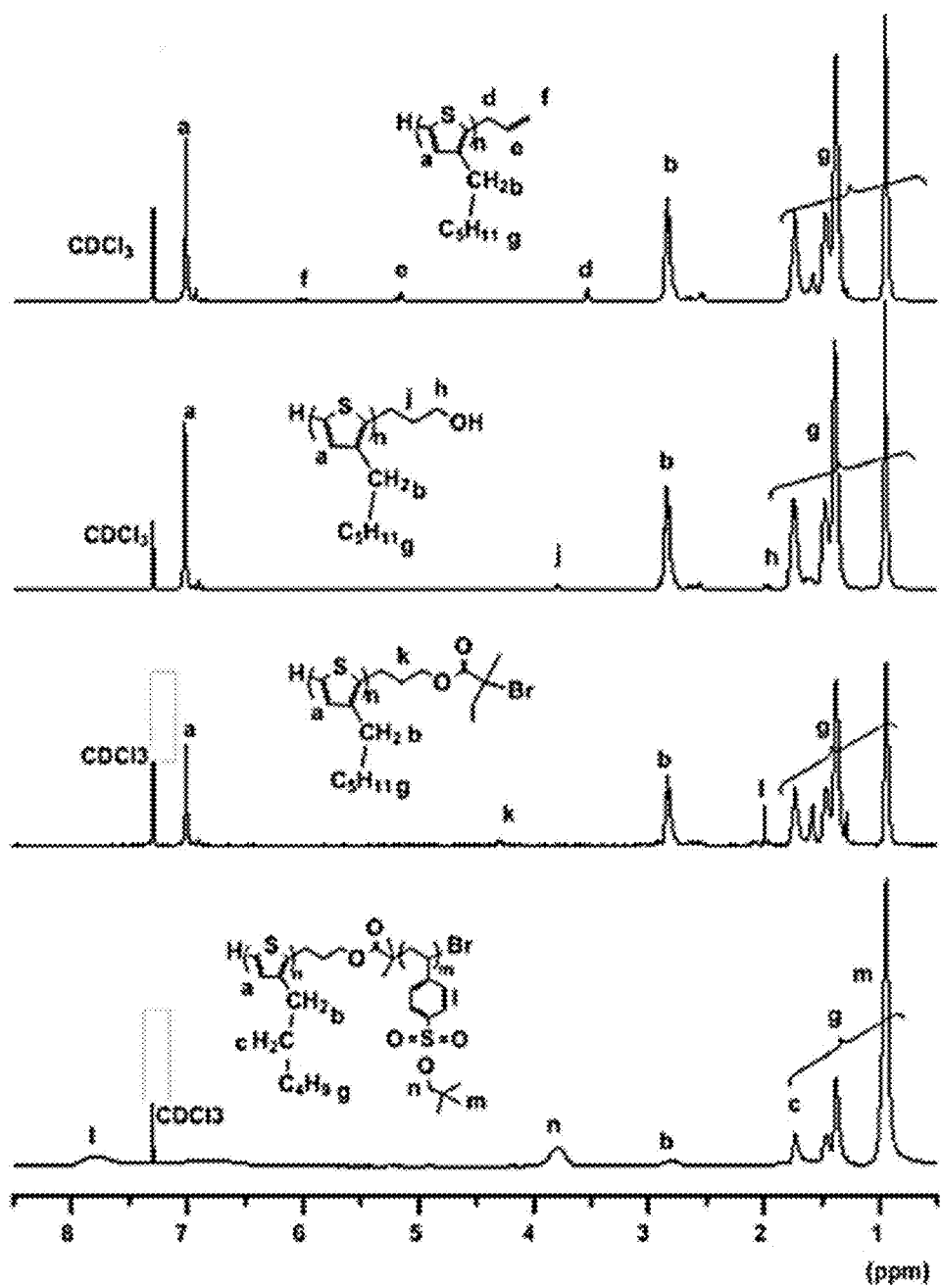
FIGS. 1A and 1B show an H-NMR chart (FIG. 1A) and gel permeation chromatography (GPC) chart (FIG. 1B) of the block copolymer according to an embodiment.

Exemplary embodiments now will be described more fully hereinafter with reference to the accompanying drawings, in which exemplary embodiments are shown.

In one aspect, there is provided a CNT-polymer complex that includes carbon nanotubes (CNT) coated with a block copolymer of a conjugated polymer and a non-conjugated polymer, wherein the non-conjugated polymer includes at least one monomer selected from the group consisting of styrene, butadiene, isoprene, methacryl, acryl, acryl amide, methacryl amide, acrylonitrile, vinyl acetate, vinyl pyridine and vinyl pyrrolidone in which at least one selected from the group consisting of a sulfone group, carboxyl group, acryl group and phosphate group is protected with a protective group, and provides at least one dopant selected from the group consisting of a sulfone group, carboxyl group, acryl group and phosphate group by external stimuli in a solution or solid phase so that self-doping is allowed; and the complex is soluble to an organic solvent in a neutral state but is insoluble to any solvent after subjecting it to external stimuli.

The CNT-polymer complex disclosed herein includes CNT dispersed uniformly in a polymer matrix. In addition, the CNT-polymer complex disclosed herein includes carbon nanotubes (CNT) coated with a block copolymer of a conjugated polymer and a non-conjugated polymer, wherein the block copolymer is obtained by introducing a non-conjugated polymer to a conjugated polymer. The block copolymer obtained by introducing a non-conjugated polymer to a conjugated polymer may be a conjugated rod-coil type block copolymer and the non-conjugated polymer may be a coil block.

As used herein, the non-conjugated polymer includes at least one monomer selected from the group consisting of styrene, butadiene, isoprene, methacryl, acryl, acryl amide, methacryl amide, acrylonitrile, vinyl acetate, vinyl pyridine and vinyl pyrrolidone, and has at least one functional group selected from the group consisting of a sulfone group, carboxyl group, acryl group and phosphate group. Herein, at least one functional group selected from the group consisting of a sulfone group, carboxyl group, acryl group and phosphate group is protected with a protective group.

The protective group is not particularly limited, but examples thereof include neopentyl or tert-butyl.

The non-conjugated polymer is not particularly limited but may include at least one monomer selected from the group consisting of neopentylsulfonated styrene, tert-butyl vinylbenzoate and tert-butyl acrylate, particularly neopentylsulfonated styrene.

As used herein, the conjugated polymer is not particularly limited but may be selected from the group consisting of polyacetylene, polyaniline, polypyrrole, polythiophene and polysulfur nitride, particularly, poly(3-hexylthiophene).

Particularly, the conjugated polymer may have a molecular weight of 1,000-30,000. When the conjugated polymer has a molecular weight exceeding 30,000, it shows significantly low solubility, thereby making it difficult to prepare a block copolymer.

Herein, the block copolymer of a conjugated polymer and non-conjugated polymer is not particularly limited, but may be a P3HT-b-PNSS block copolymer represented by the following Chemical Formula 1 and obtained by introducing polyneopentylsulfonated styrene (PNSS) to poly(3-hexylthiophene):

[Chemical Formula 1]

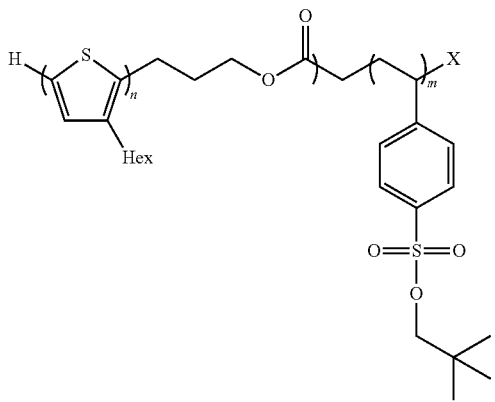

wherein Hex represents hexane, X represents a halogen atom selected from the group consisting of Cl, Br and I, n is an integer of 5-200, and m is an integer of 1-1000.

In Chemical Formula 1, X may be Br but is not limited thereto.

Particularly, in the block copolymer, the conjugated polymer block may be linked to CNT via π-π bonding and the non-conjugated polymer block may be positioned toward the exterior of CNT.

For example, in the case of a P3HT-b-PNSS block copolymer, CNT is lapped with P3HT through the π-π bonding between CNT and P3HT, while neutral PNSS blocks soluble to an organic solvent are present in the exterior of CNT. Finally, it is possible to disperse CNT uniformly in the polymer matrix through such a P3HT-b-PNSS block copolymer.

The block copolymer may be one selected from the group consisting of monoblock copolymers, diblock copolymers, triblock copolymers, multiblock copolymers, graft copolymers, star copolymers and random copolymers, but is not limited thereto.

In the CNT-polymer complex disclosed herein, the non-conjugated polymer of the block copolymer of a conjugated polymer and non-conjugated polymer has at least one functional group selected from the group consisting of a sulfone group, carboxyl group, acryl group and phosphate group, the functional group being protected with a protective group. Since such a functional group capable of self-doping is protected, it is possible to improve the solubility in an organic solvent and to facilitate film formation.

At least one functional group capable of self-doping and selected from the group consisting of a sulfone group, carboxyl group, acryl group and phosphate group is deprotected by external stimuli to show ionic properties. At this time, the conductive polymer is doped with such a functional group, thereby increasing the range of solvent selection. In this context, particular examples of solvents that may be used include THF, chloroform, methylene chloride, DMF and chlorobenzene.

The CNT-polymer complex disclosed herein is soluble to an organic solvent in a neutral state, while it is insoluble to any solvent after subjecting it to external stimuli. In other words, the complex disclosed herein is soluble to an organic solvent in a neutral state, while it is insoluble to all solvents including an aqueous solvent and organic solvent after subjecting it to external stimuli. Therefore, the complex disclosed herein allows a solution process using an organic solvent instead of the conventional aqueous solution phase process. After the treatment with external stimuli, the complex is not soluble to both aqueous and organic solvents, thereby increasing the solvent selectivity in the subsequent solution process.

Herein, the external stimuli may be carried out by using at least one selected from the group consisting of heat, light and acidic chemicals.

Particularly, the heat treatment may be carried out at 150-250° C., specifically 150-200° C. When the heat treatment is carried out at a temperature lower than 150° C., the protective group may be detached. When the heat treatment is carried out at a temperature higher than 250° C., even the conductive polymer may be decomposed.

Particular examples of the acidic chemicals that may be used herein include hydrochloric acid, nitric acid, sulfuric acid, acetic acid, $BBr_3$ and $(Bu_3Sn_2)O$.

As used herein, the carbon nanotube may be at least one selected from the group consisting of single-walled carbon nanotube (SWCNT), double-walled carbon nanotube (DWCNT), multi-walled carbon nanotube (MWCNT) and rope-walled carbon nanotube (RWCNT).

In another aspect, there is provided a process for preparing a CNT-polymer complex, including:

preparing a block copolymer of a conjugated polymer and a non-conjugated polymer;

blending carbon nanotubes (CNT) with the block copolymer to provide CNT coated with the block copolymer; and subjecting the neutral complex obtained from the operation of providing CNT coated with the block copolymer to post-treatment using at least one external stimulus selected from the group consisting of heat, light and acidic chemicals to carry out self-doping.

The complex obtained by the method disclosed herein is soluble to an organic solvent in a neutral state before subjecting it to external stimuli, while it is not soluble to any solvent after the treatment with external stimuli.

In the method disclosed herein, the non-conjugated polymer includes at least one monomer selected from the group consisting of styrene, butadiene, isoprene, methacryl, acryl, acryl amide, methacryl amide, acrylonitrile, vinyl acetate, vinyl pyridine and vinyl pyrrolidone in which at least one selected from the group consisting of a sulfone group, carboxyl group, acryl group and phosphate group is protected with a protective group, and provides at least one dopant selected from the group consisting of a sulfone group, carboxyl group, acryl group and phosphate group by external stimuli so that self-doping is allowed.

When preparing the CNT coated with the block copolymer, the block copolymer of a conjugated polymer and non-conjugated polymer is dissolved sufficiently in an organic solvent such as a nonpolar solvent, CNT is introduced thereto, and the materials are blended with sonication. Herein, in order to remove the remaining non-dispersed CNT, centrifugal separation may be carried out 4-5 times. Then, the solvent may be removed by a rotary evaporator.

The post-treatment may be any one of heat treatment, photo-treatment and treatment with an acidic chemical. Particularly, heat treatment may be carried out at 150-250° C. as mentioned above. The alkyl groups in the polymer are substituted with hydrogen through the post-treatment, so that the resultant product may be applied as a conductive material capable of self-doping. For example, each of polyneopentylsulfonated styrene, poly-tert-butyl vinyl benzoate and poly-tert-butyl acrylate is shown in the following reaction schemes before and after it is subjected to post-treatment.

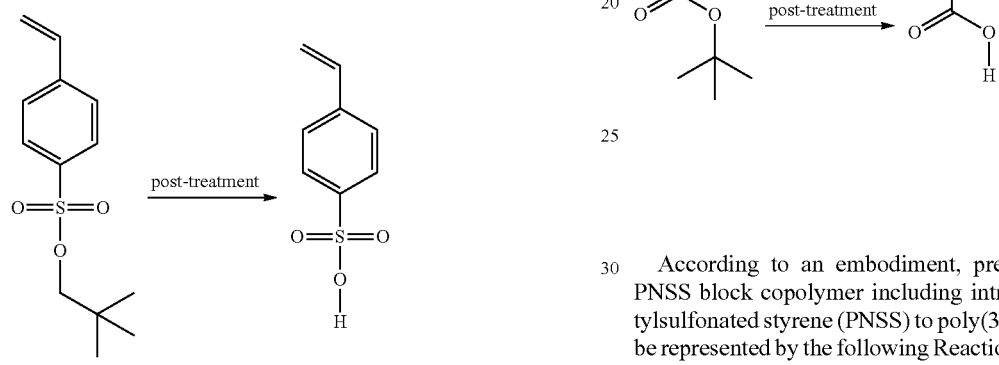

According to an embodiment, preparation of P3HT-b-PNSS block copolymer including introducing polyneopentylsulfonated styrene (PNSS) to poly(3-hexylthiophene) may be represented by the following Reaction Scheme 1, but is not limited thereto.

[Reaction Scheme 1]

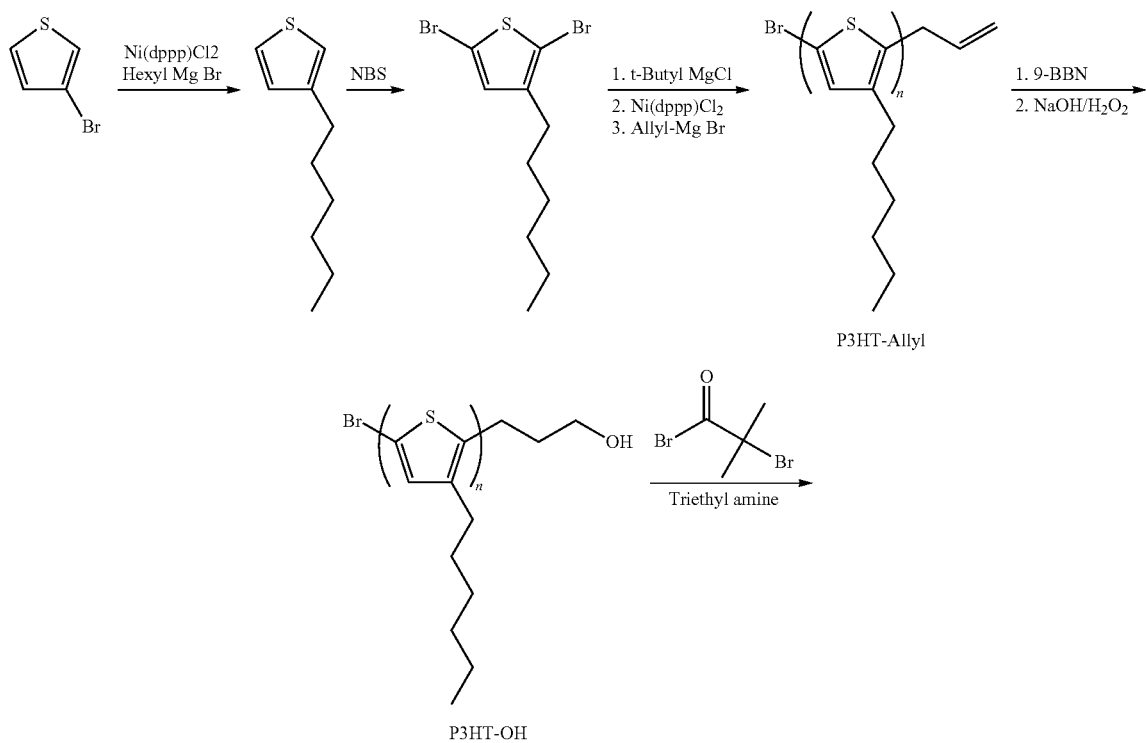

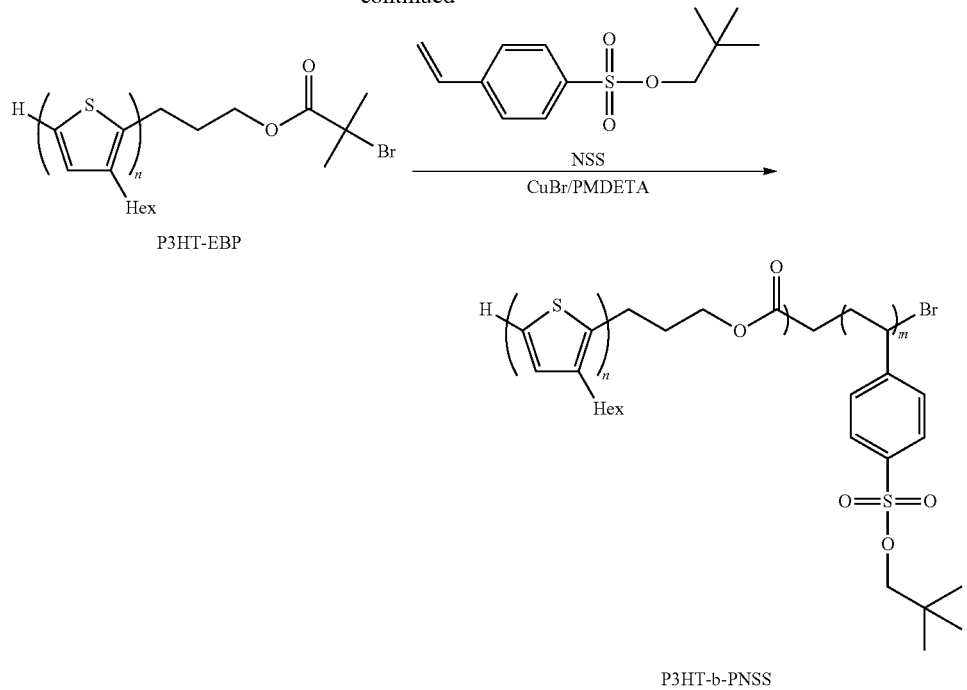

P3HT-EBP

P3HT-b-PNSS wherein Hex represents hexane, n is an integer of 5-200, and m is an integer of 1-1000.

In still another aspect, there is provided a method for preparing a conductive thin film by using a block copolymer capable of self-doping by external stimuli, the method including: forming a conductive thin film on a substrate by using a block copolymer capable of self-doping by external stimuli; and carrying out post-treatment by treating the resultant substrate with at least one of heat, light and acidic chemicals.

Particularly, the substrate may be subjected to surface treatment by subjecting the substrate to at least one selected from the group consisting of Piranha solution treatment, acid treatment, base treatment, plasma treatment, ambient pressure plasma treatment, ozone treatment, UV treatment and polymeric or monomolecular coating processes.

The method for preparing a conductive thin film may further comprises carrying out secondary doping by exposing the complex to vapor of organic solvent or adding the organic solvent to the complex. The conductivity can be dramatically improved through secondary doping of organic solvent onto the film prepared by heat treatment (annealing).

The organic solvent may be polar organic solvent. Also, the organic solvent may be at least one selected from the group consisting of THF, DMSO, DMF, ethyl alcohol and ethylene glycol.

In other words, according to the present disclosure, poly (3,4-ethylenedioxythiophene) is blended with carbon nanotubes modified through heat treatment and acid treatment to obtain a hybrid water dispersion solution in order to carry out dispersion of CNT on the basis of a hybrid solution of carbon nanotubes with poly(e,4-ethylenedioxythiophene) and a process for preparing the same (Korean Patent Laid-Open No. 10-2014-0027719). It is known that modification with an acid may cause degradation of properties of CNT. Moreover, such water dispersion may serve to shorten the lifespan of an organic electronic when applying the water dispersion to organic electronics. Therefore, as disclosed herein, carbon nanotubes are blended with a linear block copolymer including a polythiophene polymer and a polymer having a protective group at a sulfonate group or the like, thereby providing a hybrid solution having excellent dispersibility in an organic solvent.

According to the present disclosure, a neutral three-dimensional polymer including a polythiophene polymer and a polymer having a protective group at a sulfonate group or the like has been found in order to obtain conductivity higher than the conductivity of the conventional PEDOT:PSS. It is shown that such a polymer allows film formation through a solution process based on solubility to an organic solvent, and provides increased conductivity through in-situ treatment including deprotection and doping on polythiophene. It is known that use of a complex of polythiophene with carbon nanotubes as a substitute for the known hole extraction layer including PEDOT/PSS provides excellent conductivity as shown in [Hybrid Carbon Nanotube Networks as Efficient Hole Extraction Layers for Organic Photovoltaics (ACS Nano, 2013, 1, 556-565)]. According to the present disclosure, in order to obtain a material carrying out doping on both polythiophene and CNT, carbon nanotubes are blended with a linear block copolymer including a polythiophene polymer and a polymer having a protective group at a sulfonate group or the like, thereby providing a hybrid solution having high dispersibility in an organic solvent. Then, the hybrid solution is formed into a film, which in turn is subjected to heat treatment to carry out doping on the carbon nanotubes and polythiophene in situ. As a result, a synergic effect of the conductive polymer and carbon nanotubes is realized in terms of improvement of conductivity.

EXAMPLES

The examples (and experiments) will now be described. The following examples (and experiments) are for illustrative purposes only and not intended to limit the scope of the present disclosure.

Example

1. Synthesis of P3HT-b-PNSS Block Copolymer

1) Preparation of Poly 3-hexylthiophene Having Allyl Group at the End Thereof: Synthesis of 2,5-dibromo-3-hexylthiophene Monomer and Poly(3-hexylthiophene) Having Allyl Group at the End Thereof In the presence of 0.0012 eq. of [1,3-bis(diphenylphosphine)propane]dichloronickel (II) (Ni(dppp)Cl$_2$) catalyst, 1.3 eq. of hexylmagnesium bromide (Hexyl-MgBr) is added to 3-bromothiophene monomer to obtain 3-hexylthiophene, and then 2 eq. of N-bromosuccimide (NBS) is further added thereto to obtain 2,5-dibromo-3-hexylthiophene monomer.

The resultant 2,5-dibromo-3-hexylthiophene monomer is dissolved into dehydrated and deaerated THF, and then allowed to react with t-butyl-MgCl dissolved in dimethyl ether under argon atmosphere at room temperature for 2 hours. Then, 0.016 eq. of Ni(dppp)Cl$_2$ is added as a catalyst and initiator, and the reaction mixture is allowed to react at room temperature for about 10 minutes to polymerize poly(3-hexylthiophene).

To carry out substitution with an allyl group at the end of the resultant polymerized poly(3-hexylthiophene), allylmagnesium bromide (Allyl-MgBr) as Grignard reagent is added in an amount of about 0.2 eq. and reaction is carried out for about 2 minutes, and then methanol is added thereto to terminate polymerization. The resultant poly(3-hexylthiophene) (P3HT) is precipitated in methanol, extracted with a glass filter, and purified by a solvent extraction process using pentane to remove low-molecular weight polymer. In this manner, P3HT having an allyl group introduced to the end thereof is obtained.

2) Preparation of Poly(3-hexylthiophene) Macro-initiator: Synthesis of (3-hexylthiophene) Having Hydroxyl Group Introduced to the End Thereof and Poly(3-alkylthiophene) Having Bromoester Introduced to the End Thereof To introduce a hydroxyl group to the end of P3HT substituted with an allyl group at the end thereof, allyl group-containing poly(3-hexylthiophene) is added to dehydrated and deaerated THF and dissolved sufficiently therein, and 10 eq. of 9-BBN (9-borabicyclononane) is introduced under argon atmosphere to carry out reaction at 40° C. for 24 hours. Then, 2 mL of 6M NaOH solution is introduced thereto to carry out reaction for 15 minutes, and the reaction mixture is cooled to room temperature. After the temperature reaches room temperature, 2 mL of 33% aqueous H$_2$O$_2$ is added, the reaction mixture is warmed to 40° C., and reaction is carried out for 12 hours. After the completion of the reaction, the resultant product is precipitated in a solution containing methanol mixed with heavy water, extracted with a glass filter, and subjected to a solvent extraction process using methanol to remove the unreacted materials.

To introduce a bromoester group to the end of poly(3-alkylthiophene), poly(3-alkylthiophene) having a hydroxyl group at the end thereof is added to dehydrated and deaerated THF and dissolved sufficiently therein, and then TEA is further introduced under argon atmosphere to carry out reaction at 40° C. for about 15 minutes. After the reaction, 2-bromo-2-methylpropanoyl bromide is added dropwise, and reaction is carried out at 40° C. for 12 hours to obtain poly(3-hexylthiophene) having a bromoester group introduced to the end thereof. The resultant product is precipitated in methanol, extracted with a glass filter, and purified by washing with cold methanol (MeOH). The resultant poly(3-hexylthiophene) macro-initiator is analyzed for its structure by 1H NMR and the results are shown in FIGS. 1A and 1B.

P3HT-b-PNSS block copolymer is prepared by ATRP polymerization of the PNSS-containing block copolymer using the bromoester group-containing P3HT as a macro-initiator. The macro-initiator is dissolved sufficiently in deaerated and dehydrated toluene under argon atmosphere, and then gaseous impurity is removed through freeze-pump-thaw. Then, CuBr and PMDETA are added as polymerization catalyst to carry out reaction for 10 minutes, and monomers are introduced thereto to carry out reaction at 80° C. After the reaction, the reaction mixture is quenched at −78° C. and precipitated in MeOH.

Figure 1B:
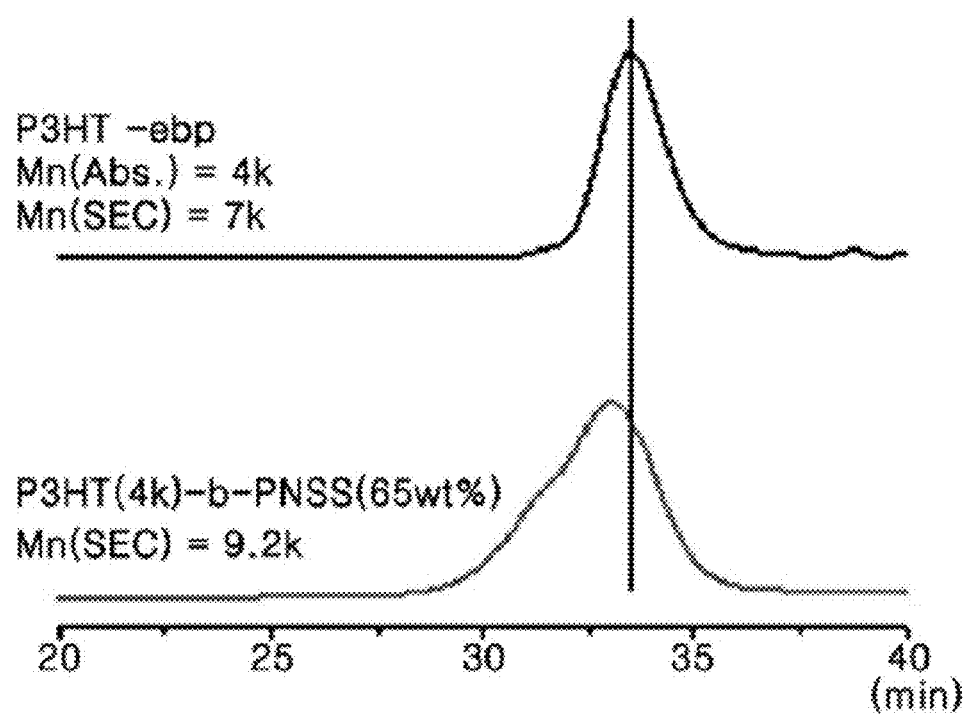

In FIGS. 1A and 1B, preparation of each material is determined by checking the peaks appearing in 1H-NMR during the synthesis of poly(3-hexylthiophene), and the molecular weight and molecular weight distribution are determined by using GPC.

Figure 3:
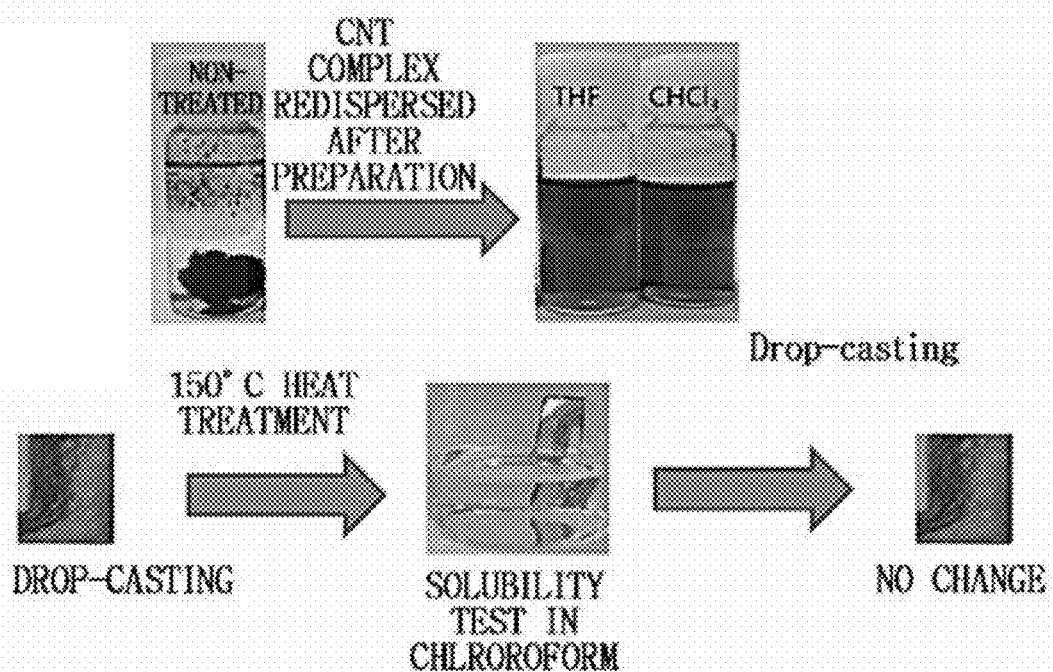
FIG. 3 shows a photograph of a sample dispersed by the process according to an embodiment and a photograph illustrating the results of a solubility test after forming a film.

The photograph at the upper portion of FIG. 3 shows CNT dispersed in chloroform before the complexation with a polymer and it can be seen that CNT is not dispersed sufficiently. It can be also seen that redipsersion of CNT after the complexation with a polymer allows dispersion in THF and chloroform. A thick film is formed through drop casting, and it can be seen that the film is not soluble to any solvent after it is solidified and subjected to heat treatment at 150° C.

2. Preparation of Complex of CNT with P3HT-b-PNSS

Figure 2:
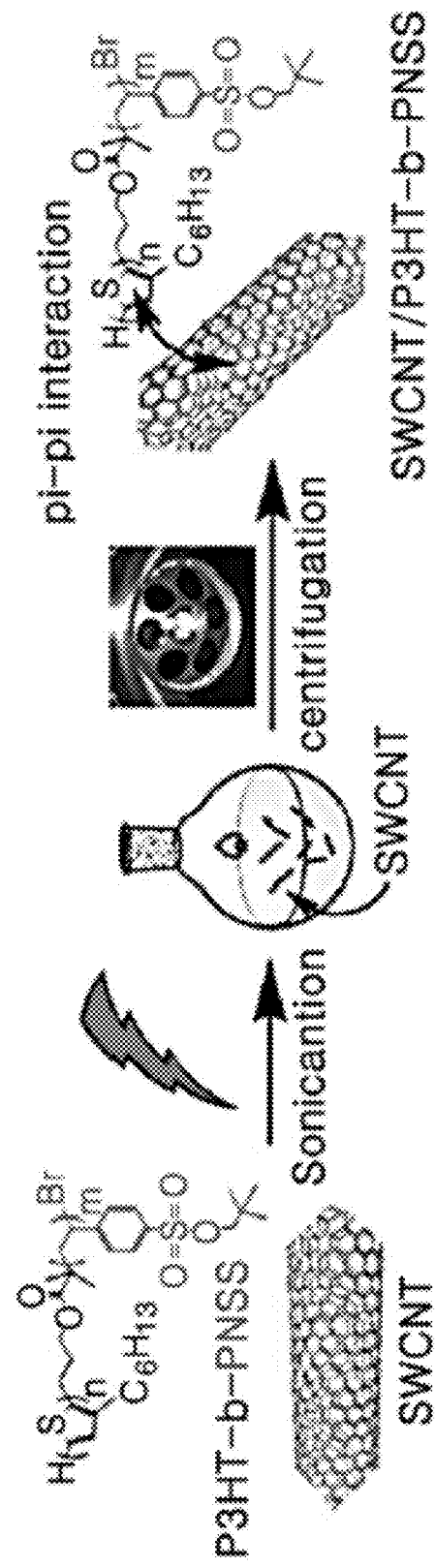
FIG. 2 is a schematic view of the process for preparing a CNT-polymer complex according to an embodiment.
Figure 4A:
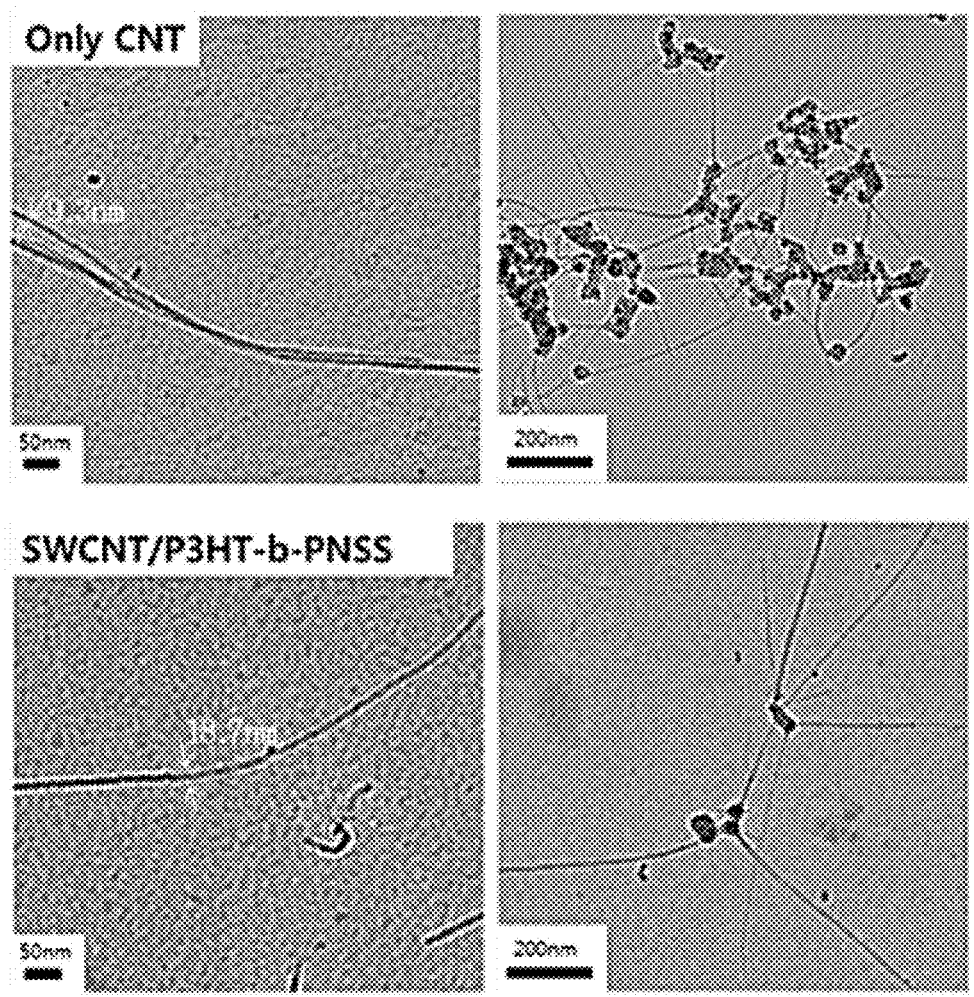
FIGS. 4A and 4B show a transmission electron microscopy (TEM) image (FIG. 4A) and Raman spectrum (FIG. 4B) of the CNT-polymer complex according to an embodiment.
Figure 4B:
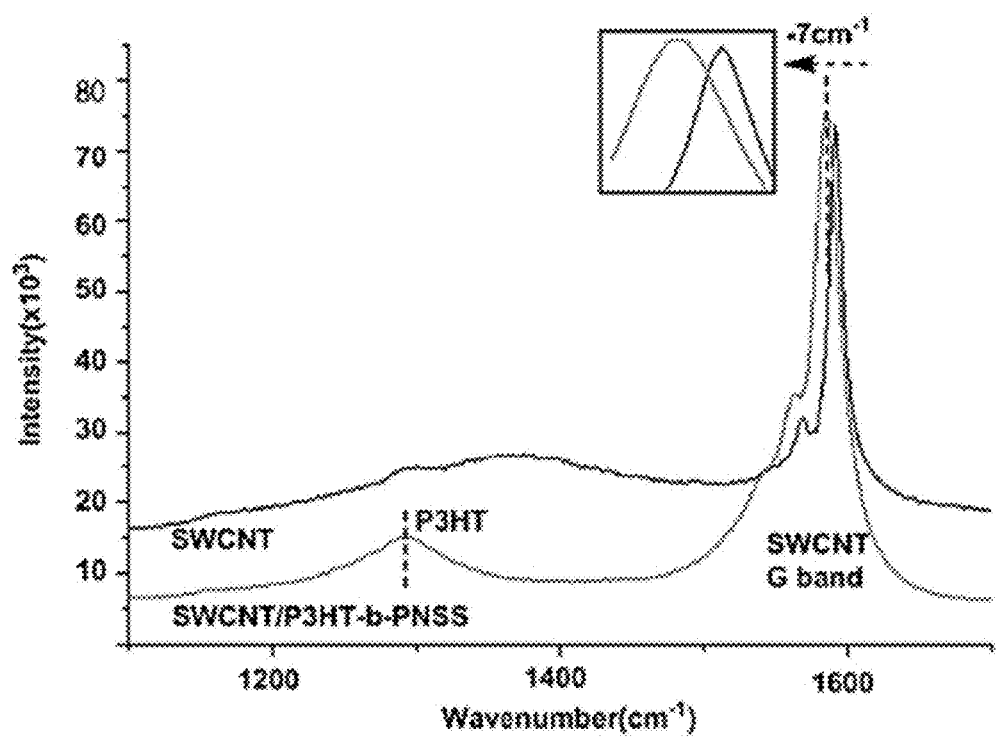

The resultant P3HT-b-PNSS block copolymer is dissolved sufficiently in a nonpolar solvent, CNT is introduced thereto, and the materials are blended by sonication. Then, the blended materials are subjected to centrifugal separation 4-5 times to remove the remaining non-dispersed CNT. This is shown schematically in FIG. 2. Then, the solvent is removed by using a rotary evaporator. Then, it is determined from Raman spectrum whether a G band shift occurs or not. It is also determined from a TEM image whether CNT is dispersed or not. The results are shown in FIGS. 4A and 4B.

3. Heat treatment of Complex of P3HT-b-PNSS Block Copolymer with CNT

Figure 5:
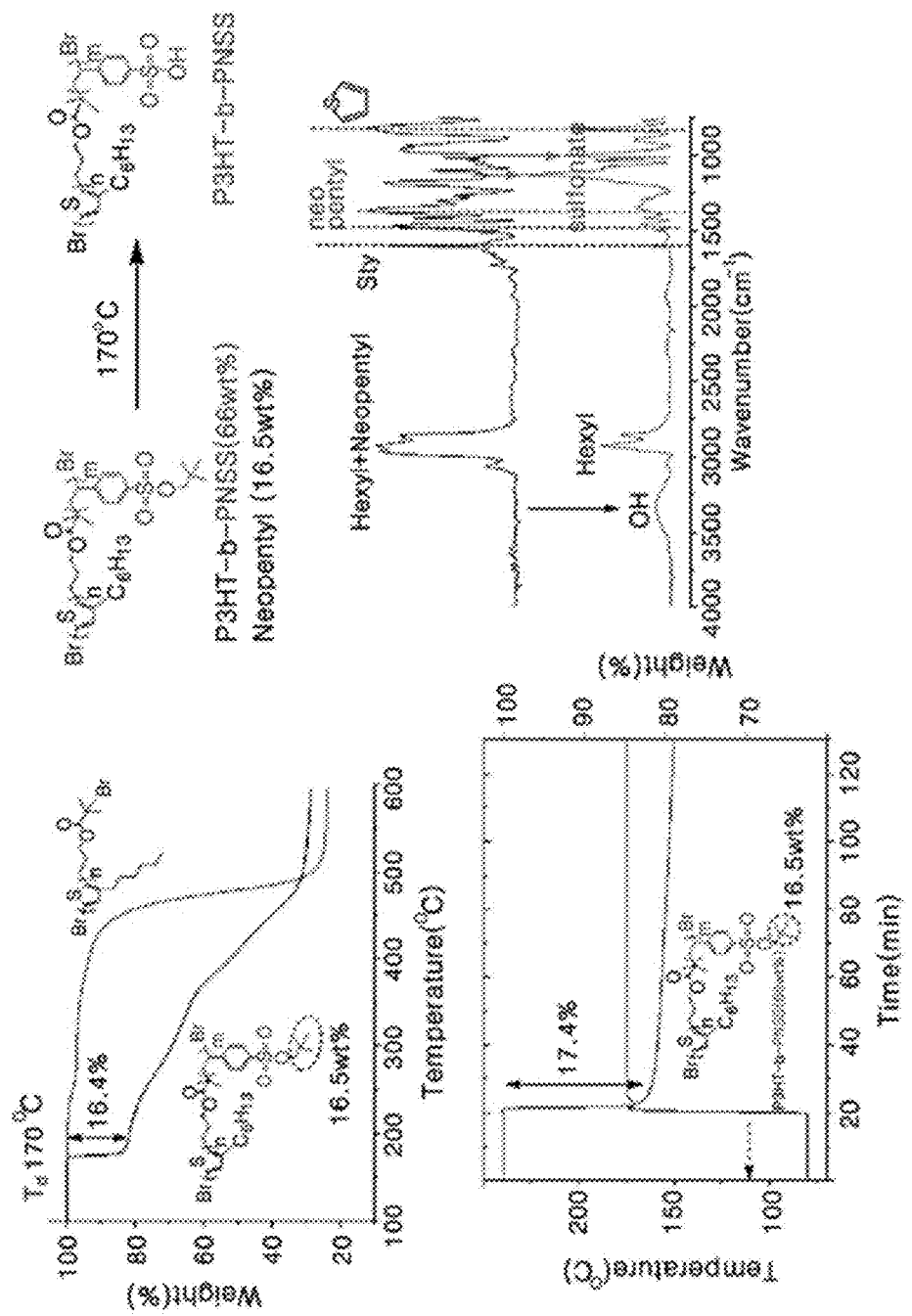
FIG. 5 shows the results of thermogravimetric analysis (TGA) of the CNT-polymer complex according to an embodiment.
Figure 6:
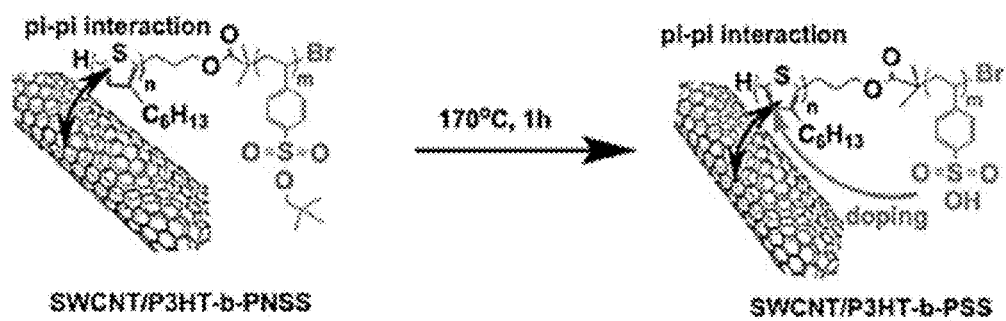
FIG. 6 shows a Fourier transform infrared spectroscopy (FT-IR) chart of the CNT-polymer complex according to an embodiment.
Figure 6:
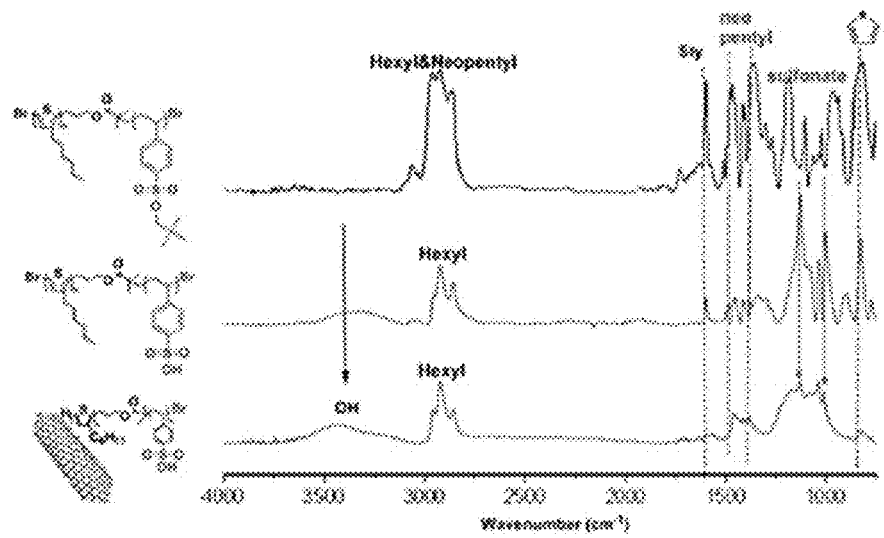

It is determined from TGA that the resultant complex has a thermal decomposition temperature of 170° C. After carrying out an isothermal test at 170° C., it can be seen that the complex is decomposed rapidly within 10 minutes. The results are shown in FIG. 5. Based on this, the CNT complex is heat treated and analyzed through FT-IR. The results are shown in FIG. 6. It can be seen from FIG. 6 that a sulfonate group (SO$_3$H) is introduced to the complex.

Test Example 1

Measurement of Electrical Conductivity of Film Formed from Complex of CNT with P3HT-b-PNSS PEDOT:PSS (Clevios P VP Al 4083) is spin coated at 3000 rpm onto a 1 cm×1 cm Si wafer on which SiO$_2$ is deposited to 300 nm, dried at 100° C. for 15 minutes by a heat treatment to obtain a 43 nm-thickness film and stored in a vacuum oven before measuring an electrical conductivity. Each of P3-HT-b-PNSS and the P3HT-b-PNSS/SWCNT complex according to Example 1 is diluted with 0.05 wt % THF and drop coated onto a 1 cm×1 cm Si wafer on which SiO$_2$ is deposited to 300 nm, thereby providing a film having an average thickness of 90 nm. Then, the film is heat treated at 170° C. for 1 hour to obtain a PSS-doped material, and stored in a vacuum oven with a gradual decrease in a temperature. The conductivities of those samples are measured by using a quadripolar measuring instrument (MCP-T610 model). The detail is shown in the following Table 1. As a result, the doped product shows a conductivity improved by about 5 times as compared to PEDOT:PSS. In other words, it can be seen that the conductivity is improved through SWCNT and improved by 25 times through the sulfonate group doping effect caused by the heat treatment. Also, it can be seen that the conductivity is dramatically improved by providing vapor of DMSO solution to CNT/P3HT-b-PSS film through annealing (heat treatment).

TABLE 1

| Sample | Sheet Resistance (Ω/□) | Thickness (nm) | Conductivity (S/cm) |
|---|---|---|---|
| PEDOT/PSS[a] | 6.965M | 43 nm | 0.33 |
| CNT/P3HT-b-PNSS | 1.68M | 93 nm | 0.064 |
| CNT/P3HT-b-PNSS(thermal) | 67.9k | 90 nm | 1.64 |
| PSS/DMSO vapor annealing | 1.026k | 90 nm | 108.3 |

[a]Clevios P VP Al 4083, 5000 Ωcm

While the exemplary embodiments have been shown and described, it will be understood by those skilled in the art that various changes in form and details may be made thereto without departing from the spirit and scope of the present disclosure as defined by the appended claims.

What is claimed is:

1. A CNT-polymer complex that comprises carbon nanotubes (CNT) coated with a block copolymer of a conjugated polymer and a non-conjugated polymer,
wherein the non-conjugated polymer comprises at least one monomer selected from the group consisting of styrene, butadiene, isoprene, methacryl, acryl, acryl amide, methacryl amide, acrylonitrile, vinyl acetate, vinyl pyridine and vinyl pyrrolidone in which at least one selected from the group consisting of a sulfone group, carboxyl group, acryl group and phosphate group is protected with a protective group, and provides at least one dopant selected from the group consisting of a sulfone group, carboxyl group, acryl group and phosphate group by external stimuli so that self-doping is allowed; and
the complex is soluble to an organic solvent in a neutral state but is insoluble to any solvent after subjecting it to the external stimuli.

2. The CNT-polymer complex according to claim 1, wherein the protective group is neopentyl or tert-butyl.

3. The CNT-polymer complex according to claim 1, wherein the external stimuli include treatment with at least one selected from the group consisting of heat, light and acidic chemicals.

4. The CNT-polymer complex according to claim 1, wherein the non-conjugated polymer comprises at least one monomer selected from the group consisting of neopentylsulfonated styrene, tert-butyl vinylbenzoate and tert-butyl acrylate.

5. The CNT-polymer complex according to claim 1, wherein the conjugated polymer is selected from the group consisting of polyacetylene, polyaniline, polypyrrole, polythiophene and polysulfur nitride.

6. The CNT-polymer complex according to claim 1, wherein the conjugated polymer has a molecular weight of 1,000-30,000.

7. The CNT-polymer complex according to claim 1, wherein the block copolymer of a conjugated polymer and a non-conjugated polymer is a P3HT-b-PNSS block copolymer represented by the following Chemical Formula 1:

[Chemical Formula 1]

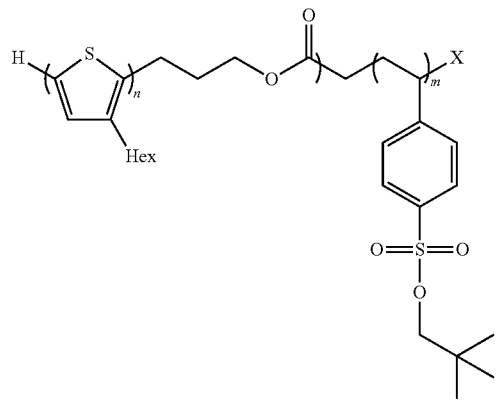

wherein Hex represents hexane, X represents a halogen atom selected from the group consisting of Cl, Br and I, n is an integer of 5-200, and m is an integer of 1-1000.

8. The CNT-polymer complex according to claim 3, wherein the heat treatment is carried out at 150-250° C.

9. The CNT-polymer complex according to claim 1, wherein the carbon nanotube is at least one selected from the group consisting of single-walled carbon nanotube (SWCNT), double-walled carbon nanotube (DWCNT), multi-walled carbon nanotube (MWCNT) and rope-walled carbon nanotube (RWCNT).

10. The CNT-polymer complex according to claim 1, wherein the conjugated polymer block in the block copolymer is linked to CNT via π-π bonding, and the non-conjugated block is positioned toward the exterior of CNT.

* * * * *